Oct. 12, 1965    C. VAN DER LELY    3,211,237
SOIL-TILLING DEVICES
Filed Oct. 17, 1961    5 Sheets-Sheet 1

INVENTOR.
CORNELIS VAN DER LELY
BY
Mason, Mason & Albright
ATTORNEYS

Oct. 12, 1965    C. VAN DER LELY    3,211,237
SOIL-TILLING DEVICES
Filed Oct. 17, 1961    5 Sheets-Sheet 2

INVENTOR.
CORNELIS VAN DER LELY
BY
Mason, Mason & Albright
ATTORNEYS

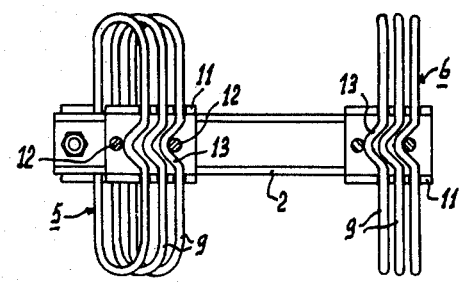
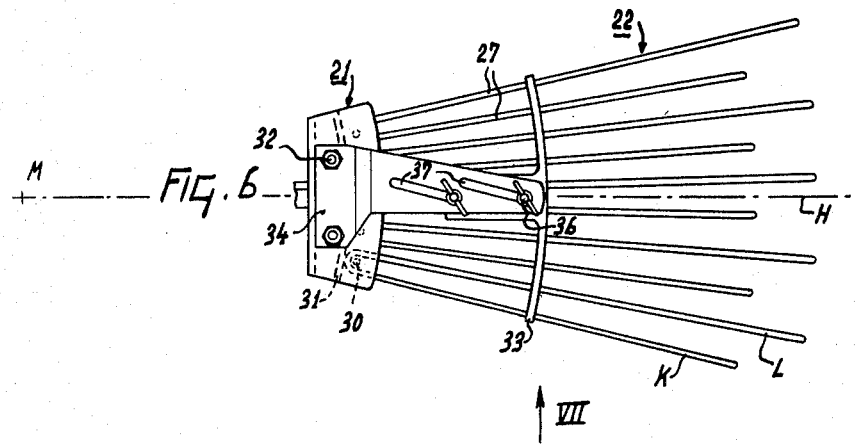
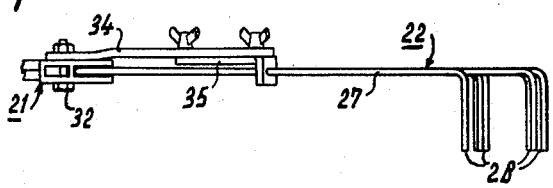
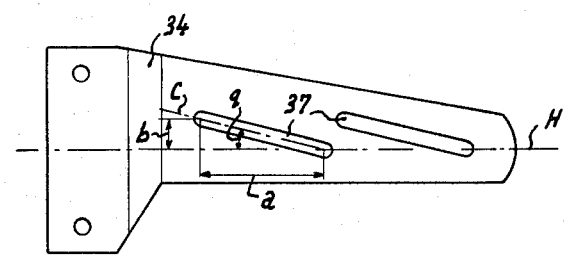

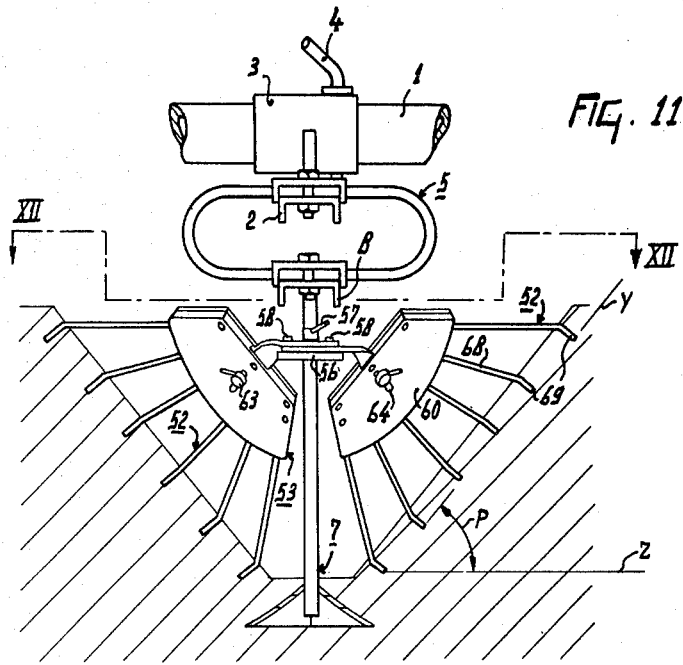
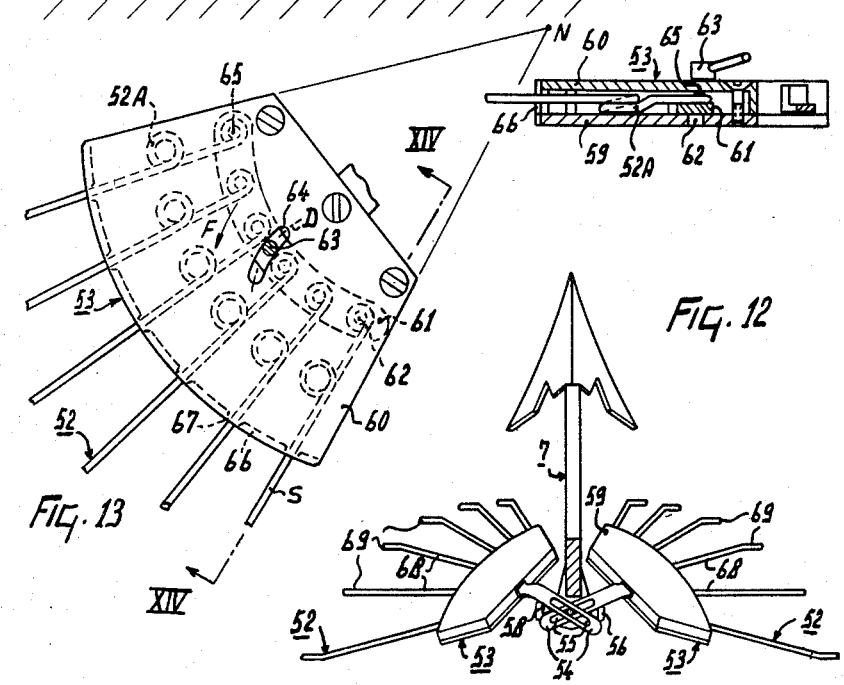

United States Patent Office 3,211,237
Patented Oct. 12, 1965

3,211,237
SOIL-TILLING DEVICES
Cornelis van der Lely, Zug, Switzerland, assignor to C. van der Lely, N.V., a Dutch limited-liability company
Filed Oct. 17, 1961, Ser. No. 145,710
Claims priority, application Netherlands, Oct. 21, 1960, 257,138
10 Claims. (Cl. 172—159)

The invention relates to a soil-tilling device suitable for cultivating crops growing on ridges.

In accordance with the invention, the device comprises a frame and at least one group of tines coupled with the frame and arranged resiliently viewed in the travelling direction of the device, the base points of at least a number of the tines are located on a substantially straight line extending transversely to the travelling direction, this line being at on angle to the horizontal.

According to a second aspect of the invention, the device comprises a frame and at least one group of tines coupled with the frame, these tines being made pairwise from one piece of resilient material bent over in a hairpinlike fashion, one tine of the integral pair of tines being shorter than the other.

In accordance with the invention, the device may comprise a frame and at least one group of tines fastened thereto, the tines being arranged side by side in a fanlike fashion, provision being made of means for the simultaneoeus displacement of a number of the tines.

For a better understanding of the invention and in order that the same may be readily carried into effect, reference will now be made to the accompanying drawings, which show a few embodiments of the device according to the invention.

FIG. 5 is an elevation taken on line V—V of FIG. 2.

FIG. 6 is an elevation in the direction of the arrow VI in FIG. 3.

FIG. 7 is an elevation in the direction of the arrow VII in FIG. 6.

FIG. 8 shows, on an enlarged scale, the plate 34 of FIG. 6.

FIG. 11 is an elevation in the direction of the arrow III in FIG. 1 of a different embodiment of the device according to the invention.

FIG. 12 is an elevation taken on the line XII—XII in FIG. 11.

FIG. 13 shows on an enlarged scale an adjusting member for the displacement of the tines of the device shown in FIGS. 11 and 12.

FIG. 14 is an elevation taken on the line XIV—XIV in FIG. 13.

Figure 1:
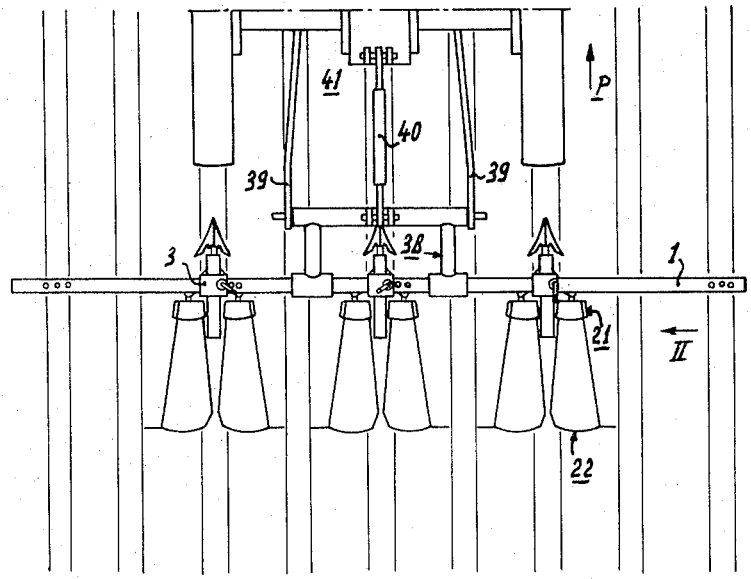
FIG. 1 is a diagrammatical plan view of the device according to the invention.
Figure 2:
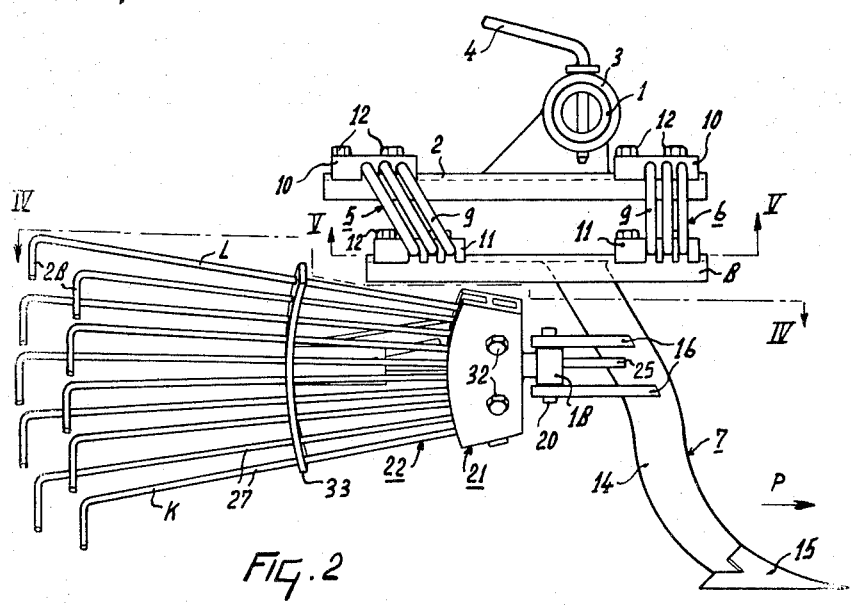
FIG. 2 shows, on an enlarged scale an elevation taken in the direction of the arrow II in FIG. 1.

The device shown in FIGS. 1, 2, 3 and 4 comprises a frame beam 1, on which supports 2 are arranged at equidistant places by means of a sleeve 3, adapted to be displaced along the frame beam 1, which sleeve can be fixed by means of a pin 4, which can be inserted into holes in the frame beam. The supports 2 extend in the travelling or normal operational direction of the device, indicated by the arrow P in FIGS. 1 and 2. With the aid of resilient members 5 and 6 the supports 2 are provided with hoeing members 7. To this end a hoeing member 7 is provided at its top end with a support 8, which extends parallel to the support 2 on the frame beam 1. The support 8 is shorter than the support 2; its front end being in line with that of the support 2 (see FIG. 2). The resilient members 5 and 6 are formed each by three adjacent brackets 9, which are made from spring steel. These brackets 9 are fastened by clamping pieces 10 and 11 and bolts 12 to the opposite ends of the supports 2 and 8. For this connection each bracket 9 is provided with a curved portion 13 (see FIG. 5); the curved portions 13 extending parallel to each other and the bolts 12 being arranged between the curved portions in the respective clamping pieces.

Figure 3:
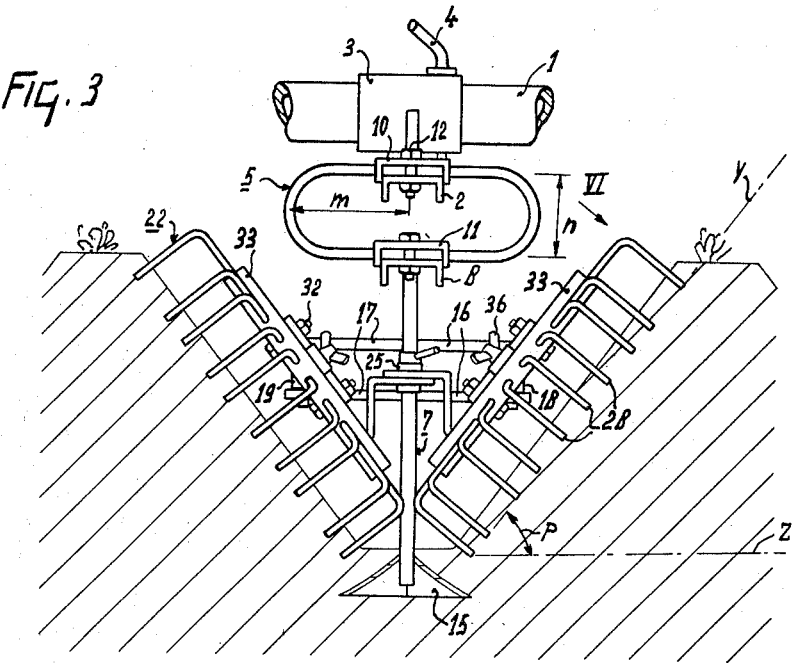
FIG. 3 shows, on an enlarged scale, an elevation in the direction of the arrow III in FIG. 1.

The brackets 9 are substantially parallel to a plane at right angles to the travelling direction of the device and extend on either side of the vertical plane going through the longitudinal center line of the supports 2 and 8 lying one above the other equal distances $m$ (see FIG. 3). The distance $m$ is preferably one-and-a-half times to twice the distance $n$ between the top ends of the supports 2 and 8. The plane to which the brackets constituting the resilient members 5 extend parallel is orientated obliquely downwards in the traveling direction. The hoeing member 7 comprises a hoe stem 14, the top end of which is secured to the support 8, a hoeing body 15 being secured to the said stem in its lower aspect. The portion of the hoe stem 14 lying above the ground is provided on either side with a pair of strips 16 and 17 respectively. These strips extend from the hoe stem 14 in lateral direction and are located in a substantially horizontal plane. The strips 16 and 17 have arranged between them a bearing 18 and 19, respectively, carried by means of vertical shafts 20, which are journalled in holes provided in the strips. To each of the bearings 18 and 19 is secured a support designated generally by reference numeral 21, which is provided with a group of tines 22 extending in a direction opposite the travelling direction P.

Figure 4:
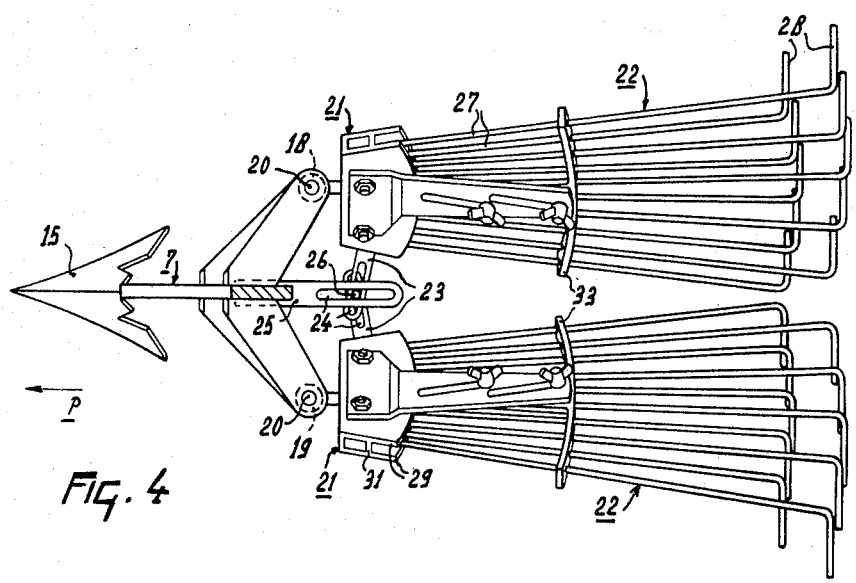
FIG. 4 is an elevation taken on the line IV—IV of FIG. 2.

From FIG. 4 it will appear that the supports 21 are provided with strips 23, each having an elongated slot 24. On the rear side of the hoe stem 14 provision is made for a strip 25, which is also provided with an elongated slot 24. Through the slots in the strips concerned is received a bolt 26, provided with a wing nut.

A plurality of tines designated generally by reference numeral 22, arranged on a support 21, are located side by side and have a substantially straight portion 27, whereas their ends 28 are bent over towards the ground in equal lengths to form hooks (see FIG. 7). Viewed in the travelling direction of the device, the base points of the tines are lying on a substantially straight line $y$, extending transversely to the travelling direction and being at an angle $p$ to the horizontal $z$ (see FIG. 3). The angle $p$ is preferably not smaller than 30°. The tines 22 are substantially located in the plane of the supports 21 and extend in a fan-shaped fashion from these supports. The support 21 comprises two plates 29 (see FIG. 4), one side of which is secured to the bearings 18 and 19, respectively.

From FIG. 6 it will be seen that the tines 22 are made from spring steel, bent over pairwise in a hairpin fashion, one tine K being shorter than the other L. The shorter tines K, like the longer tines L have equal lengths. The connecting parts of the tines are arranged between the plates 29 around pins 30, provided between these plates. The tines are arranged side by side so that between two shorter tines K always one longer tine L is provided. Behind the pins 30 provision is made of a stop 31. The connecting parts are firmly clamped between the plates 29 by means of bolts 32. This is rendered possible by providing a smaller height of the stop 31 and the pins 30 than the thickness of the tine portions lying between the plates 29. The sides of the plates 29 facing the tines extend along the arms of circles, the centers M of which are located on the sides of the plates remote from the tines. The pins 30, which constitute the fastening points of the tines, and the stop 31, located behind the pins, are located on arcs of circles having their centers coincide with the said centers M (see FIG. 6). The distances between the tines near their fastening points to the supports are smaller than the distances between their ends. The group of tines 22 is provided with means for the adjustment of the relative tine distances. These means comprise a bridge piece 33, which is arranged between the ends of the tines and their fastening points at the supports. This bridge piece also extends along the arc of a circle, having its center M, this piece being concentrical to the arcuated sides of the plates 29. The bridge piece 33 is provided with holes through which the tines are taken. The distance between the holes exceeds the distance between the tines, near their fastening points at the support. By means of the clamping bolts 32 the support 21 is provided with a plate 34, which co-operates with a strip 35 provided at the center of the bridge piece 33 and located below the plate 34 (see FIG. 7). The strip 35 is provided with bolts 36, having wing nuts and being taken through slots 37 of the plate 34. By means of the bolts 36 with their wing nuts the bridge piece 33 can be fixed at different distances from the support. The maximum distance from the support 21 is in this case substantially equal to half the length of a shorter tine K, whereas the minimum distance from the support amounts approximately to one quarter of the length of a shorter tine K.

From FIG. 6 it appears that the slots 37 in the plate 34 extend obliquely with respect to the longitudinal center line H of the group of tines. The purpose thereof will be explained more fully with reference to the operation of the device.

FIG. 1 shows that the frame beam 1 of the device is provided with a clutch 38, by means of which the device can be coupled with the lower arms 39 and the top arm 40 of a three-point lifting device of a tractor 41.

Figure 9:
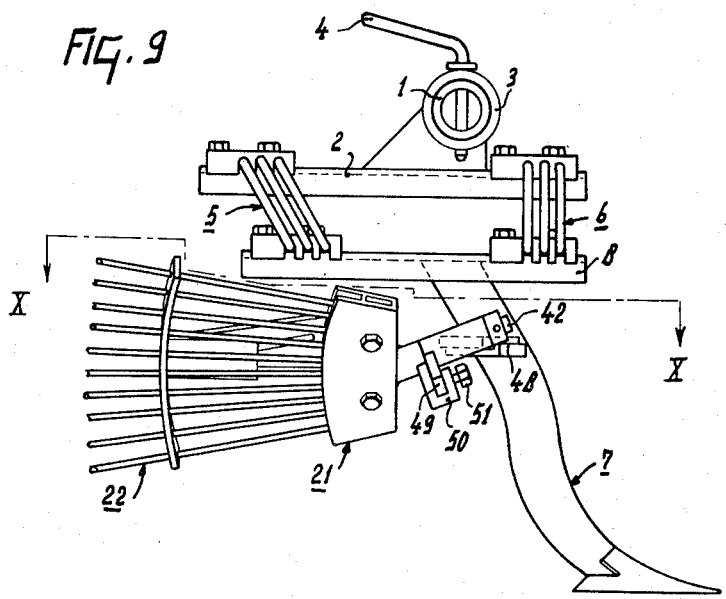
FIG. 9 is an elevation in the direction of the arrow II in FIG. 1 of a different embodiment of the device according to the invention.
Figure 10:
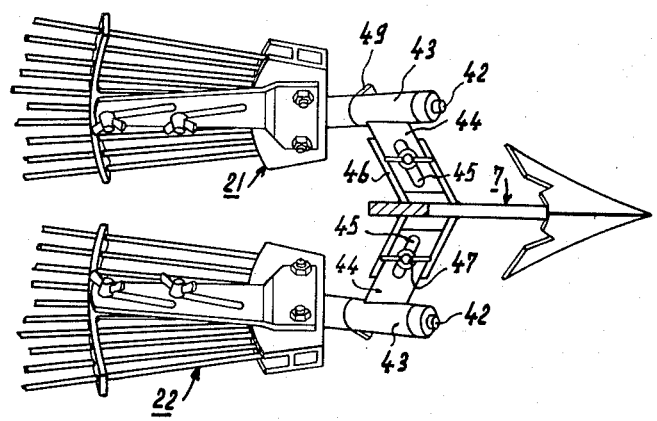
FIG. 10 is an elevation taken on the line X—X in FIG. 9.

FIGS. 9 and 10 show one embodiment of the device, which is largely identical to the first-mentioned embodiment. In this embodiment, however, the support 21 of a group of tines 22 is adapted to turn about a shaft 42. This shaft intersects the podal line of the tines at or substantially at the base point of the lowermost tine. The shaft 42 is adapted to turn in a bearing 43, to which a strip 44 is secured. This strip 44 is provided with an elongated slot 45. Each strip 44 is adapted to co-operate with a strip 46. The strips 46 are arranged each on one side of the portion of the hoe stem 14 normally free of the ground and are provided with a bolt 47 having a wing nut. The bolt 47 is taken through the slot 45 of the strip 44. The strips 46 are furthermore provided with upright rims 48 for guiding the strips 44. To each bearing 43 is secured a segment 49, around which is bent over a tag 50, provided on the shaft 42. This tag 50 is provided with a pin 51, which can be inserted into holes of the segment 49.

FIGS. 11 to 14 relate to a third embodiment of the device. In this embodiment a group of tines 52 is arranged on each side of the hoeing member 7. Each group of tines 52 comprises at least six tines and has a support 53, to which a strip 54 is secured. Each strip 54 is provided with an elongated slot 55 (see FIG. 12). The portion of the hoe stem 14 above ground is provided with a plate 56, which is provided at the center with a bolt 57 with a wing nut, on each side of which bolt provision is made of stops 58. The strips 54 are arranged crosswise between the stops 58 (see FIG. 12) and are held in place by the bolt 57, taken through the slots 55.

The support 53 comprises two plates 59 and 60, between which a strip 61 is provided, which is adapted to pivot about a shaft 62 (see FIGS. 13 and 14). The strip 61 is, moreover, provided with a bolt 63, which is guided in a slot 64, in which it can be fixed in different positions. The slot 64 extends along the arc $d$ of a circle, the center of which is located on the longitudinal center line of the pivotal shaft 62. The strip 61 is provided at equal distances with pins, around which the ends of the single tines 52 are arranged between the plates 59 and 60. These pins are designated in FIG. 13 by 65 with the exception of the pin around which is arranged the end of an outer tine or tines, this pin constituting moreover the said pivotal shaft 62 for the strip 61. The plate 59 is provided on the side facing the tines with a bent-over rim 66, which is orientated towards the plate 60. This rim 66 is provided at equal distances with holes 67, through which the tines 52 are taken. The distance between the holes 67 exceeds the distance between the fastening points on the strip 61 and the walls of the said holes are concave.

The plates 59 and 60, on the sides facing the tines, extend along arcs of circles, the centers N of which are located on the side remote from the tines. The strip 61 and the row of pins 65 arranged on it for fastening the tines also extend along arcs of circles having the same center N and are parallel to the sides of the plates 59 and 60 facing the tines.

The tines 52 extend from the support 53 in a fan-shaped fashion. They are located substantially in the plane of the support and have a substantially straight portion 68, which is bent over at the end 69 towards the ground. The tine portions lying between the plates 59 and 60 are provided near the fastening point on the strip 61 with loop portions 52A.

Similarly to the first and the second embodiment of the device the base points of the tines are located, viewed in the travelling direction of the device, on a line $y$, transverse to the said travelling direction, which line is at an angle $p$ to the horizontal $z$ (see FIG. 11).

The device to which the present application relates, is intended for the cultivation of crops growing on ridges, for example in potato culture. With cultivations on ridges it is desirable to weed not only between the ridges but also on the two slopes thereof. Moreover it is particularly important to carry out the weeding operation as near the plants as possible without damaging the plants themselves.

For this weeding operation on the slopes of the ridges the device described above is equipped with groups of tines, which may be arranged on a hoeing member intended for working the soil in the trenches. The groups are arranged so that the tines are capable of working the opposite slopes of the ridges with their bent-over ends near the plants without causing damage to the crop.

The device operates as follows:

During the travel of the device in the direction of the arrow P (FIG. 1) the hoeing members are dragged through the soil, so that the trenches are worked. The groups of tines secured to the hoeing members which tines are located behind the hoeing member, viewed in the travelling direction, work the opposite slopes of two ridges during the travel.

From the figures it will be seen that in all embodiments the tines are arranged so, that during the weeding operation they are capable of weeding quite near the plants without touching the crop on the ridges to an appreciable extent. In operation the groups of tines are immovable with respect to the frame of the device.

In the first embodiment the groups of tines are adapted to turn about a vertical shaft 20 for matching the distance between the ridges, the center line of the shaft 20, viewed in the travelling direction of the device, crossing the substantially straight podal line of the tines at a point, which is located in the proximity of the lowermost tines. By means of the bolt 26 with the wing nut, taken through the slots 24 of the strips 23 and 25, the groups of tines can be fixed in different positions (see FIG. 4). The group of tines shown in this embodiment is provided with means for varying the distance between the tines in order to vary the operational width of the group.

These means, as stated above, comprise a bridge piece 33, which can be displaced in the direction of the longitudinal center line H of the group of tines (see FIG. 6). The bridge piece can be secured in various positions with the aid of the bolts 36, arranged on the strip 35, these bolts being displaced in the slots 37 of the plate 34 during the adjustment. The distance between the tines at their ends exceeds the distance between the tines near their fastening point at the support, which is indicated above by the adverbial adjunct "in a fan-shaped fashion." Since the tines are taken through holes in the bridge piece, which are spaced apart from each other by a distance exceeding the distance between the tines near their fastening points, a displacement of the bridge piece in the direction of the longitudinal center line H, either towards the support or away from the support, will result in a variation of the relative distance between the tines. If the bridge piece is brought near the support, the distance between the tines increases and if the bridge piece is moved away from the support, the distance between the tines is reduced. From FIG. 3 it will be seen that during the aforesaid displacement the tine lying nearest the bottom of the trench will remain at its place, whereas the other tines are displaced. To this end the slots 37 (see FIG. 6) extend substantially parallel to the direction of the lowermost tine.

FIG. 8 shows that the center line $c$ of a slot 37 is, towards the side of the support 21, at an angle $q$ to the longitudinal center line H of the group of tines. In this case tan $$q = \frac{b}{a}$$

wherein $b$ designates the distance over which the bridge piece is displaced during its adjustment with respect to the said longitudinal center line and $a$ is the distance over which the bridge piece is displaced in a direction transverse to the said center line.

With this structure a displacement of the bridge piece 33 in the direction of the longitudinal center line H either towards the support or away from the support will result in a displacement of the bridge piece at right angles to the longitudinal center line H. The latter displacement is equal to the distance $b$, referred to above and is opposite the direction in which the tine concerned is displaced. The tine concerned will therefore remain substantially at its place during the adjustment.

In the embodiment shown in FIGS. 9 and 10 the groups of tines of the first embodiment are adapted to turn about a shaft 42, the prolongation of the longitudinal center line of which intersects the substantially straight podal line of the tines, viewed in the direction of travel, at the base point or substantially at the base point of the lowermost tine. By inserting the pin 51 into different holes of the segment 49, the position of the groups of tines can be adjusted to the slopes of the ridges. Moreover, the groups of tines can be adjusted transversely to the direction of travel by moving the strips 44 and 46 into different positions relative to each other and by fixing them in these positions by means of the bolt 47, which is taken through the elongated slot 45. The tines can be adjusted in the same manner as described with reference to the first embodiment.

In the embodiment shown in FIGS. 11 and 12 the groups of tines can also be adjusted in a direction transverse to the travelling direction of the device by displacing the strips 54 with respect to the plate 56, the strips being fixable in different positions by means of the bolt 57.

From FIG. 11 it will be seen that the adjustment of the group of tines to the slope of the ridge requires apart from a variation in the relative distance between the tines, lying above the lowermost tine, also a variation in length of these tines. This is achieved by a structure of the kind shown in FIG. 13. When the strip 61 is turned about the pivotal shaft 62, the tines, with the exception of the tine, the fastening point of which coincides with the pivotal shaft 62, are displaced. A turn of the strip 61 in the direction of the arrow F (see FIG. 13) results in an increase in the free length i.e. the length of the tine parts projecting beyond the support 53 and, moreover an increase in the relative distance between the tines. If the strip 61 is turned in the opposite direction, the free length of the tines is reduced, as well as the distance between them.

The structure shown in FIG. 13, in which the adjustment of the distance between the tines brings about a variation in the free length, provides a satisfactory adaptation of each group of tines to the slopes of the ridges, since in this structure the free length of the topmost tine increase most, then the free length of the tine lying below the former increases to a smaller extent, and so on and the lowermost tine maintains at least substantially its initial position.

As stated above, the hoeing member is resiliently fastened to the device. This member is adapted to deflect in the travelling direction of the device at least substantially parallel to itself in a resilient manner; thus during the weeding operation this member will constantly perform a vibration in the direction of travel, so that the weeding effect of groups of tines is intensified. As stated above, the tines may be arranged side by side so that each shorter tine K is located at the side of each longer tine L (see FIG. 6). Thus the space between the bent-over tine ends 28 is increased, so that the risk of blockage and hence of a poor effect is materially reduced.

Since, as is shown in the embodiment of FIG. 6, all tines may be made from pieces of material of equal lengths, they can be manufactured in a simple and ready manner.

It will be obvious that the groups of tines may, as an alternative be directly arranged on the frame of the device, the tines being disposed side by side in a V-shaped or inverse V-shaped arrangement, viewed in the travelling direction.

It will furthermore be obvious that the groups of tines can be arranged on a hoeing member not resiliently fastened to the frame in the same manner as is described above for a hoeing member resiliently secured to the frame.

What we claim is:

1. A tilling device for the cultivation of the slopes of soil ridges, comprising a frame, a stem having a hoe body secured to the lower portion of said stem, at least one group of resilient tines, a pair of vertically spaced substantially horizontally extending strips fixedly secured to said stem above the hoe body, a bearing mounted between two of said strips to provide a substantially vertical axis, a support means for said tines journalled on said bearing and means for selectively fastening said support in a plurality of adjusted positions, whereby the position of the tines relative to the hoe body can be changed, the tines of said group over most of their length extending substantially parallel and being canted from the horizontal in conformity with the slope of a ridge, said tines extending side by side in a fan-like fashion, the utmost free ends of said tines being bent towards the slope of the ridge.

2. A tilling device as claimed in claim 1, wherein the tines of said group are paired and made from one piece of resilient material that is bent over in a hairpin-shaped fashion, one tine of an integral pair being shorter than the other.

3. A tilling device as claimed in claim 1, wherein the said support means includes a rotary shaft which is inclined to the horizontal and the center line of the said rotary shaft, viewed in the traveling direction of the device, intersects the podal line of the tines of said group at a point which substantially coincides with the base point of the lowermost tine in said group.

4. A device as claimed in claim 3, wherein provision is made for a bearing for the rotary shaft and a segment thereon and the adjusted member comprises a tag on said support, said tag being bent over around a segment, and a clamping bolt for securing said tag in different positions with respect to said segment.

5. A device as claimed in claim 1, wherein the tines of said group are arranged side by side in a fan-like fashion and the device includes adjusting means for simultaneously adjusting effective length of the tines.

6. A device as claimed in claim 5, wherein the support includes a shaft and two plates, the said adjusting means comprising a strip on which the tines are secured, said strip being pivotably arranged on said shaft between said two plates of the support.

7. A device as claimed in claim 6, wherein the tines are rotatably connected to the said strip.

8. A device as claimed in claim 7, wherein a pin around which an end of one of the outer tines is arranged also forms the pivotable shaft for the said strip.

9. A device as claimed in claim 8, including a bolt and nut, wherein the plates have an arcuate slot in which said bolt with said nut provided on the strip is adapted to move in order to fix the strip in different positions relative to the plates, said slot forming part of a circle, the center of said circle being located on the longitudinal center line of the pivotal shaft.

10. A device as claimed in claim 8, wherein the plates have arcuate sides and the arcuate side of one plate is provided with a bent-over rim, the said bent-over rim facing the other plate and being provided with holes through which the tines are taken.

References Cited by the Examiner

UNITED STATES PATENTS

| | | | |
|---|---|---|---|
| 444,609 | 1/91 | Hallock | 172—643 |
| 622,162 | 3/99 | Pattisson | 172—543 |
| 724,175 | 3/03 | Fuller | 172—707 X |
| 726,168 | 4/03 | Kelley | 172—194 |
| 866,722 | 9/07 | Hess | 172—643 X |
| 1,159,568 | 11/15 | Bush | 172—655 X |
| 1,910,299 | 5/33 | Lessig | 172—194 X |
| 2,055,521 | 9/36 | Dennis | 56—400.18 |
| 2,149,429 | 3/39 | Finkes | 56—400.18 |
| 2,632,371 | 3/53 | Shoemaker | 172—655 X |
| 2,805,613 | 9/57 | Siems | 172—643 |
| 2,904,951 | 9/59 | Glover | 56—400.18 |

FOREIGN PATENTS

| | | |
|---|---|---|
| 278,631 | 10/14 | Germany. |
| 670,520 | 4/52 | Great Britain. |

ANTONIO F. GUIDA, *Acting Primary Examiner.*

T. GRAHAM CRAVER, *Examiner.*